US006715602B1

United States Patent
Gartland (10) Patent No.: US 6,715,602 B1
(45) Date of Patent: Apr. 6, 2004

(54) SENSOR SYSTEM FOR CONVEYOR BELT (75) Inventor: John James Gartland, Delaware, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/295,226

(22) Filed: Nov. 15, 2002

(51) Int. Cl.$^7$ .............................................. B65G 43/06
(52) U.S. Cl. .............................. 198/810.02; 198/502.1; 340/676; 474/106
(58) Field of Search ...................... 198/810.02, 844.1, 198/847, 502.1; 340/676; 474/106

(56) References Cited

U.S. PATENT DOCUMENTS

| | | | | |
|---|---|---|---|---|
| 3,731,113 A | | 5/1973 | Lowe | 307/119 |
| 3,742,477 A | | 6/1973 | Enabnit | 340/259 |
| 3,831,161 A | | 8/1974 | Enabnit | 340/259 |
| 3,899,071 A | * | 8/1975 | Duffy | 198/810.02 |
| 3,922,661 A | | 11/1975 | Enabnit | 340/259 |
| 4,017,826 A | | 4/1977 | Enabnit | 340/58 |
| 4,437,563 A | * | 3/1984 | Oriol | 198/810.02 |
| 4,463,434 A | * | 7/1984 | Haylett et al. | 198/810.02 |
| 4,621,727 A | * | 11/1986 | Strader | 198/810.02 |
| 4,854,446 A | | 8/1989 | Strader | 198/810 |
| 5,168,266 A | * | 12/1992 | Fukuda | 340/676 |
| 6,264,577 B1 | * | 7/2001 | Hutchins | 474/106 |
| 6,352,149 B1 | | 3/2002 | Gartland | 198/810.02 |

FOREIGN PATENT DOCUMENTS

| | | | |
|---|---|---|---|
| DE | 44 44 264 C 1 | 4/1996 | B65G/43/02 |
| DE | 196 03 578 A 1 | 8/1997 | B65G/15/30 |

* cited by examiner

*Primary Examiner*—Khoi H. Tran
(74) *Attorney, Agent, or Firm*—Richard B. O'Planick (57) ABSTRACT

A conveyor belt includes a plurality of identification transponder chips embedded into the belt at spaced intervals. At least one conductive loop is embedded adjacent to and in electromagnetic coupled relationship with each transponder chip. The chip induces an identification signal into its respective conductor loop that is detected by a detector head and is cross-referenced by control circuitry to a specific loop and location on the belt. A second detector head may be mounted and coupled to the loop to monitor loop integrity by detecting or failing to detect the responsive identification signal from each transducer. Embedded transducer elements may further be utilized for wear rate monitoring and identification of exact locations in the belt.

20 Claims, 5 Drawing Sheets

SENSOR SYSTEM FOR CONVEYOR BELT

FIELD OF THE INVENTION

The invention relates generally to conveyor belts having electrically conductive sensor loops embedded therein and, more particularly, to a sensor system for a conveyor belt for detecting and locating belt degradation and damage.

BACKGROUND OF THE INVENTION

In a multitude of commercial applications, it is common to employ a heavy duty conveyor belt for the purpose of transporting product and material. The belts so employed may be relatively long, on the order of miles, and represent a high cost component of an industrial material handling operation. In many applications, the belts are susceptible to damage from the material transported thereby and a rip (slit, cut or tear) may develop within the belt. A torn or ripped belt can be repaired once detected. The cost of repairing a heavy duty conveyor belt and the cost of cleaning up material spilled from the damaged belt can be substantial. If, however, such a rip or tear commences and the belt is not immediately stopped, the rip can propagate for a substantial distance along the belt. It is, therefore, desirable to detect and locate a rip in the belt as quickly as possible after it commences and to immediately terminate belt operation, whereby minimizing the extent of the damage to the belt.

It is well known to employ sensors within conveyor belts as part of a rip detection system. In a typical system, sensors in the form of loops of conductive wire are affixed or embedded in the belt and provide a rip detection utility as part of an overall rip detection system. Rip detection is achieved through the inferential detection of an "open circuit" condition in one or more of the sensor loops in the belt. Typically an electrical energy source external to the belt is inductively or capacitively coupled to a sensor loop in the belt. A break in the conductive wire loop of the sensor may be detected by a remote transmitter/receiver (exciter/detector). Disposition of a plurality of such sensors at intervals along the conveyor may be effected with each sensor passing within read range of one or more exciter/detectors at various locations. A rip or tear will encounter and damage a proximal sensor loop and the existence of the tear will be detected when the proximal sensor loop damage is detected as an open circuit by the reader at its next pass. In this manner, the existence of a tear will be promptly detected and repaired and damage to the belt therefrom minimized.

U.S. Pat. No. 3,742,477 (Enabnit; 1973) discloses a "figure eight" sensor loop useful within belt sensor system. U.S. Pat. No. 4,854,446 (Strader; 1989) teaches a "figure eight" sensor loops disposed at intervals along a conveyor belt. U.S. Pat. No. 6,352,149 (Gartland, 2002) provides a system in which antennae are embedded in a conveyor belt to couple with an electromagnetic circuit consisting of two detector heads and an electronic package. Coupling occurs only when an antenna passes across the detector heads and can only occur when the loop integrity has not been compromised.

SUMMARY OF THE INVENTION

The subject invention concerns a sensor system for a conveyor belt that facilitates rip detection and location. According to the invention, at least one rip detection sensor is incorporated within a conveyor belt and comprises a conductor formed in an endless loop. A transponder is incorporated within the belt coupled electromagnetically to the conductor loop. The transponder transmits an identification signal responsive to an energizing signal whereby the location of the transponder and its respective loop antenna/sensor along the belt may be ascertained. The responsive identification signal from the transponder is induced into the conductor loop and relayed thereby to a proximate reader/detector. A second reader/detector is mounted at an opposite side of the belt and its function is to monitor the integrity of the conductive loop by detecting or not detecting the presence of the transponder response in the loop. The ID number of the transponder, once received by the reader/detector, is cross-referenced by control logic to recognize the specific physical location of the coupled loop/transponder on the belt. The location on the belt where a rip or tear occurs may thereby be determined.

According to one aspect of invention, the second detector may be employed to monitor the integrity of the conductor loop. The second detector detects the presence or absence of the response identification signal from the transponder in the conductor loop. If the loop is not intact, the signal will not be carried by the loop and the second sensor head will not detect the signal. Non-detection of the response signal denotes an open circuit in the conductor loop, indicative of a rip or tear in the belt at the location of the loop. The control unit in such an event would immobilize the belt via a relay and indicate the location in the belt at which the rip occurred.

According to another aspect of the invention, a redundant transponder may be deployed in coupled association with each conductor loop to maintain operation of the system in the event that the first transponder becomes damaged. Another aspect of the invention is to deploy a second conductor loop concentric with the first conductive loop to maintain the system in an operable state in the event that the first conductor loop breaks from mechanical failure rather than a rip or tear to the belt.

According to another aspect of the invention, the transponder chip may be housed within a package comprising opposed outside layers of reinforcement material and a center layer of elastomeric material. The transponder may be embedded within the elastomeric layer to protect the transponder from external forces acting on the belt.

According to another aspect of the invention, the transponder chip may be configured into an elongate geometry having a longitudinal axis. The chip may be oriented within the conveyor belt transverse to the direction of belt travel to minimize stress forces on the transponder chip. The package in which the chip is incorporated may further include a protrusion to readily facilitate positioning the package relative to the belt in order to achieve the preferred transverse orientation of the chip relative to the direction of belt travel.

According to another aspect of the invention a method is provided for manufacturing a sensor system for a conveyor belt incorporating within it a rip detection sensor comprising at least one conductor formed in an endless loop. The method comprises the steps: providing a transponder coupled with the loop and adapted to transmit an identification signal responsive to an energizing signal; providing a transmitter for transmitting the energizing signal to the transponder; locating a detector adjacent the belt to receive the identification signal from the transponder; providing detection means to detect the presence of a discontinuity in the conductor loop; and providing control means to issue a stop command to immobilize the belt in the event a discontinuity in the conductor loop is detected.

According to the invention, the method may further include providing a redundant transponder and/or a redundant conductor loop. The method may further include embedding the transponder within a layer of elastomeric material and packaging the transponder and the elastomeric material layer between opposite layers of reinforcement material.

According to the invention, the method may further include the step of establishing a preferred orientation of the transponder chip relative to a direction of belt travel.

Additional aspects of the invention will be understood by those skilled in the art from the embodiment described in detail below and illustrated by the accompanying drawings.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
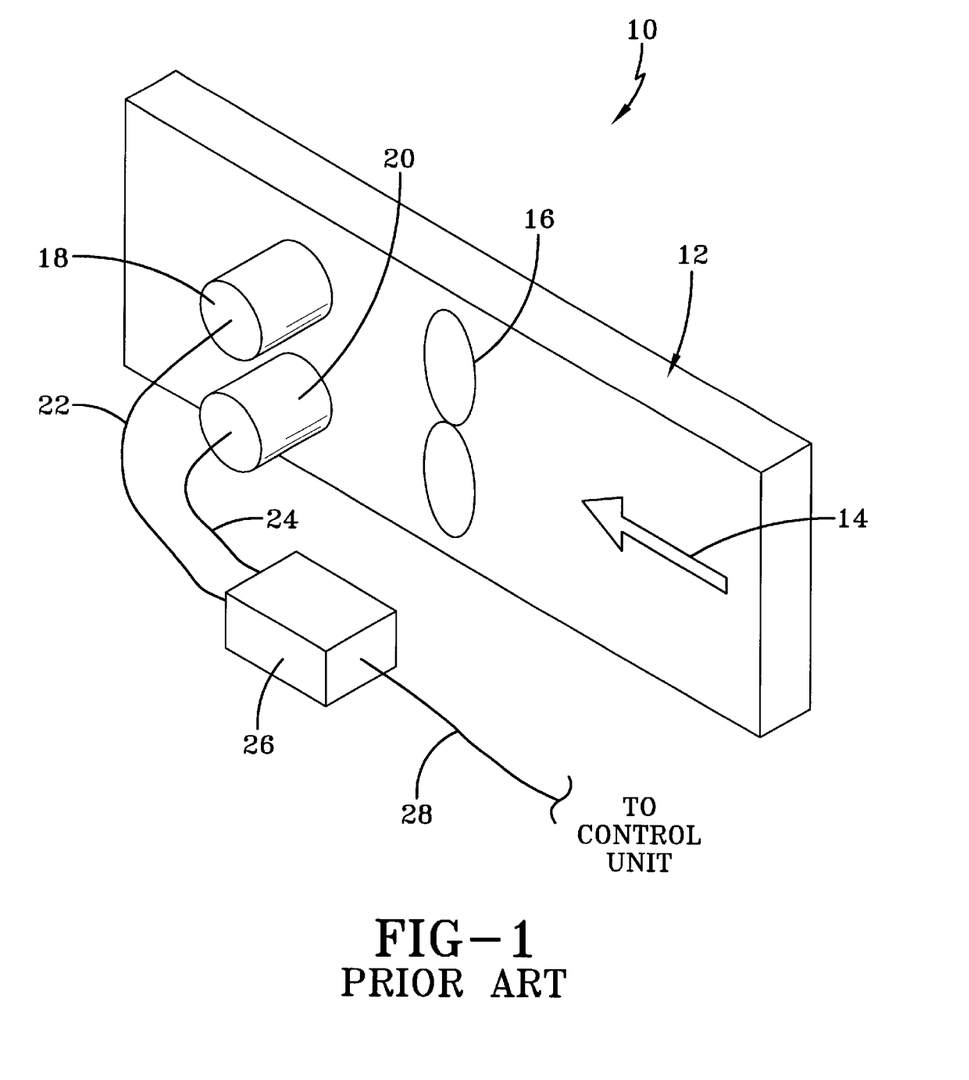
FIGS. 1A-B is a schematic view of a prior art sensor system for a conveyor belt.
Figure 1B:
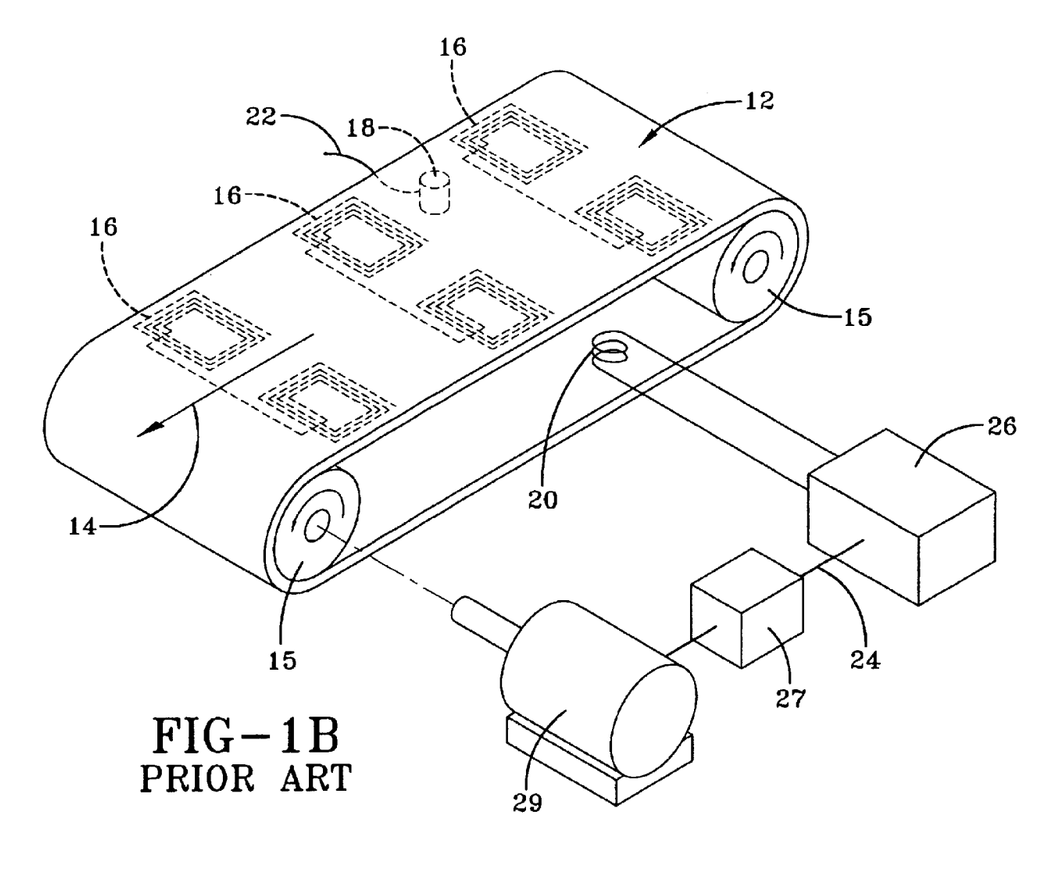

Referring initially to FIGS. 1A and 1B, a prior art conveyor belt rip detection system 10 is shown of the type taught in U.S. Pat. No. 6,352,149, incorporated herein by reference. The system comprises conveyor belt 12 that travels in a direction 14 driven by rollers (or pulleys) 15. A series of spaced apart conductors or sensors 16 are embedded within the conveyor belt 12. Each conductor 16 is formed in an endless loop arranged in a "figure 8" configuration. The sensor is configured for incorporation within the conveyor belt 12 of conventional structure having a top load bearing surface, a middle carcass layer, and a pulley cover. The sensor 16 may be embedded within any of the three layers. The rip detection system includes an external transmitter/exciter 18 and one or more receiver/detectors 20 of a commercially available type. The devices 18, 20 are routed by leads 22, 24, respectively through a junction box 26 to a motor controller 27 via lead 28. Controller 27 controls drive motor 29 that operatively drives the rollers 15. The system sensors 16 are spaced apart from each other and embedded in the elastomeric conveyor belt 12 transverse to the direction of belt travel 14.

The conductors/sensors 16 may use either magnetic or electric fields for excitation/detection. The conductors 16 carry a current flow therein when subjected to an electrical or magnetic field. A rip in the belt 12 will eventually propagate far enough to cause one of the conductors 16 to be broken. The transmitter 18 emits an electrical or magnetic field that is communicated by conductors 16 to a receiver 20 provided the conductor 16 is intact. Receiver 200 provides a signal to control circuitry that processes the signal and indicates a rip. The rip signal may result in an alarm and/or a signal to the motor controller 27 to automatically stop the motor 29 driving the belt 12 and shut down the conveyor belt 12.

A discontinuity in at least one of the sensors 16 will be detected by the detector(s) 20 and the belt 12 stopped. The system represented in FIGS 1A and 1B protects by using antennae 16 embedded in the belt 12. During normal operation, the two detector heads 20 are mounted equidistant from the edges of the belt such that the largest area of the antenna loops pass over the detector heads as the belt cycles. When the system couples with a passing loop, a resonance peak is generated and the system looks for to determine the location of the loop on the belt. If a rip occurs in the belt and the integrity of a loop is compromised, the electromagnetic circuit will no longer detect the loop and a stop signal is triggered, limiting the amount of damage to the belt. Separation of the loops 16 in the belt may be monitored in terms of time or distance.

In the time mode the system will wait a given amount of time before it expects to detect a loop. If this set time is exceeded without detecting a loop, the system will trip a relay and shut the belt down. This approach is limited in that it does not correlate to the actual motion of the belt and the degree of protection is highly dependent on the speed of the belt.

In the distance mode, there are two options: standard distance and pattern distance. The standard distance mode is not dependent on the speed of the belt but rather utilizes a proximity sensor or encoder to determine the position of the loops. The system scans the belt and determines the largest distance separating any two loops in the belt and protects to that distance. With the pattern mode, the system synchronizes on the smallest loop separation during calibration and protects the belt for each subsequent loop separation in order. In this functional mode the system monitors the sensor pattern in the belt in order to protect. A difficulty, however, is encountered when the sensor pattern within the belt is irregular or has been modified by loss of one or more sensors, or a repair of the belt that results in an alteration in the spacing between belt sensor loops.

With regard to prior art systems of the type previously described, several limitations will be apparent. First, the prior art system synchronizes on the smallest gap in the belt in order to determine its location on the belt. The sensor loop location in the belt and loop signal are not correlated for loop identification, making troubleshooting relatively imprecise. In the prior art system of FIGS. 1A and 1B, the reader is programmed to look for a loop at a certain interval (time or distance). If the belt speed changes from slippage or the like, the synchronization between the reader and the loop sensors is inhibited, throwing the system out of sync. In such an event, the system must re-synchronize the reader to the sensor pattern in order to resume its rip monitoring duty. If a belt has been repaired and the pattern of sensor loops within the belt altered, the same problem will arise; that is, the reader will not "know" the sensor pattern within the belt has been modified.

Because a sensor's location within in the belt is not precisely ascertainable when a rip occurs in state of the art systems, a "Stop on Command" is not possible. The belt must be stopped and physically examined in order to know the precise location of a rip or tear. The belt cannot, without a "Stop on Command" capability, be stopped at a position that would be the most convenient from which to effect belt repair or inspection. Additionally, in such state of the art systems the configuration of the loop design is relatively rigid and inflexible. Because existing system use analog signals to ascertain the integrity of the loop, the systems are also vulnerable to misreadings due to extraneous "noise". Moreover, existing systems cannot readily facilitate wear rate monitoring with their sensor configurations and the systems are prone to premature failure from breakage of the sensor loops by stress forces encountered through normal operation of the belt.

Figure 2:
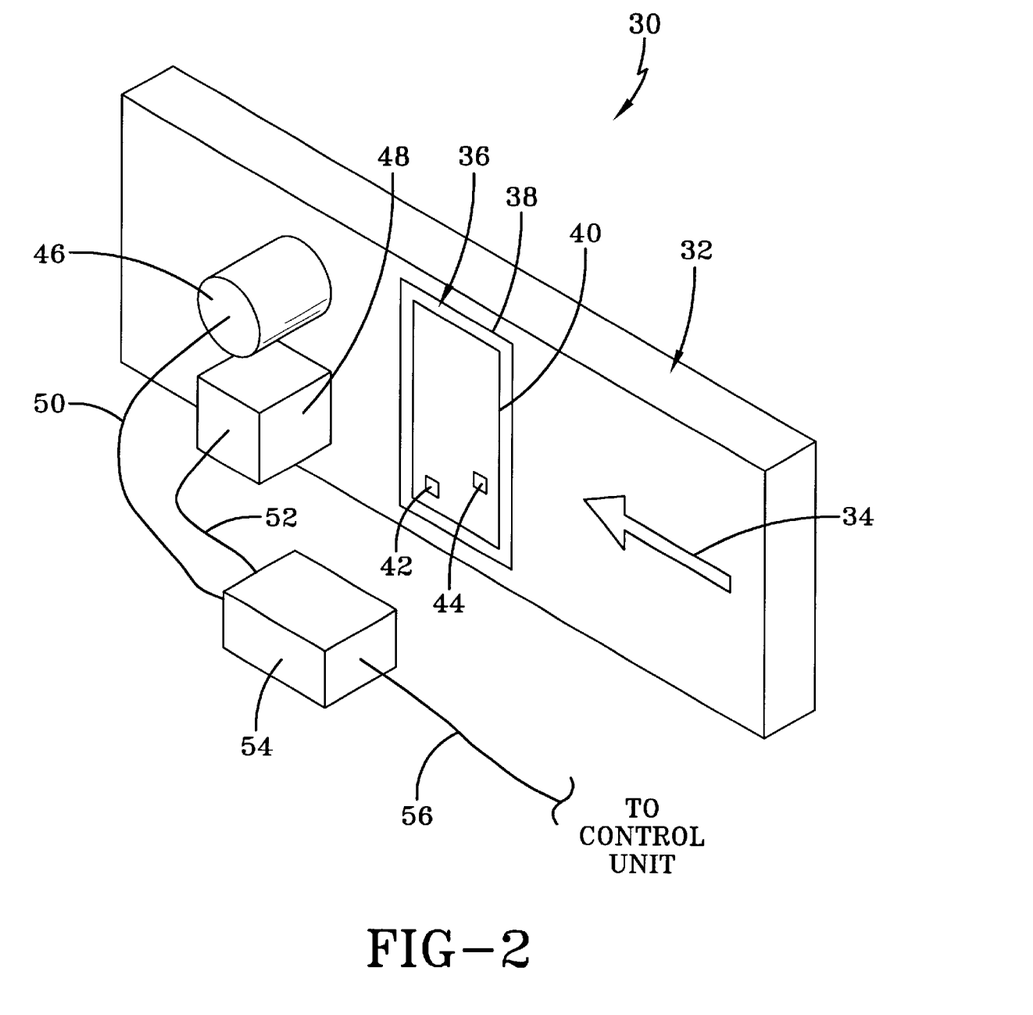
FIG. 2 is a schematic view of the an embodiment of the present invention.

Referring to FIG. 2, one conveyor belt rip detection system embodiment of the present invention is illustrated. The system includes a conveyor belt 32 moveable in the direction indicated at 34 in the manner described above. The motor, motor controller, and roller drive system (not shown) are as shown in U.S. Pat. No. 6,352,149. The system includes a transponder and antenna system 36 that includes a pair of concentric antennae/sensor loops 38, 40 and a pair of ID transponders 42, 44. The transponders 42, 44 are integrated into respective elongate semiconductor chips having an integral coupling coil by which both transponders may be electromagnetically coupled to both the loops 38, 40. In the preferred embodiment, the transponders 42, 44 are located and coupled to opposite longitudinal sides of the loops 38, 40 in mutually offset relationship. The loops 38, 40 are generally rectangular and sized to span the width of the belt. Other loop geometries may be utilized if preferred.

A pair of detectors 46, 48 are mounted adjacent the belt 32 in the positions shown. Detector 46 is disposed over conductor loops 38, 40 at one side of the belt 32 and detector 48 is positioned over the transponders 42, 44 at an opposite side of the belt 32. Leads 50, 52 from the detectors 46, 48, respectively, input through junction box 54 and feed via lead 56 to a motor control unit (not shown).

The subject transponders 42, 44 operate at a frequency of 13.56 MHz and are commercially available. By example and without limitation a suitable transponder is manufactured by GEMPUS, BP 100-13881 Gemenos Cedex, France, and marketed carrying the product code G+Rag Series 200 AR10 10LM. Other commercially available transponders may be substituted. The use of a relatively high frequency allows for the utilization of smaller detector sizes. The transponders shown transmit a 16-bit digital, alphanumeric identification signal when energized by an appropriate field. The transponders 42, 44, as explained previously, are each fabricated into an elongate respective chip having an output coupling coil. The transponders are encoded with an identification code and may be inductively energized by a remote transmitter. The transponders 42, 44 are electromagnetically coupled through their respective output coils to both the loops 38, 40 and induce their respective identification signals into the conductor loops when energized.

A pair of reader/detectors 46, 48 of a type commercially available are provided positioned relative to the loops 38, 40 as shown in FIG. 2. Detectors manufactured and sold by Phase IV Engineering, 2820 Wilderness Place, Unit C, Boulder, Colo. 80301 under the product identification conveyor tag reader are suitable and other known commercially available readers may be substituted if desired. A coupling occurs only when the antenna loops pass across the detector heads and can only occur when the loop integrity has not been compromised. During normal operation, the two detector heads 46, 48 are mounted 1 to 11" from the edges of the belt. The transponders 42, 44 are passive and receive their operating energy from a signal induced into the loops 38, 40 by a remote transmitter (not shown). Once activated, the transponders 42, 44 induce an identification number into both conductor loops 38, 40 which are detected by reader/detector 48. Two transponders and two coupled conductor loops 38, 40 comprise each sensor along the belt in the preferred embodiment for the sake of redundancy. Should such redundancy not be deemed desirable, a series of single transponder to sensor loop coupled pairs may be employed in the practice of the invention.

The second detector head 46 is mounted over the opposite side of the belt and reads loops 38, 40 to determine whether or not the induced identification signal from the transponders 42, 44 is present. If the loop is not intact, the signal will not be carried by the loop and the second sensor head will not detect the signal. A conclusion that the loops 38, 40 have been damaged is thus drawn.

Output from the detectors 46, 48 is relayed via leads 48, 50 through a junction box 54 and output lead 56 to a control unit (not shown). The control system cross-references the identification number provided by transducers 42, 44 to a specific location on the belt. If the loops 38, 40 are not intact, the control unit (such as 27 in FIG. 1B) would shut the belt down via a relay and indicate a "rip stop".

Figure 3:
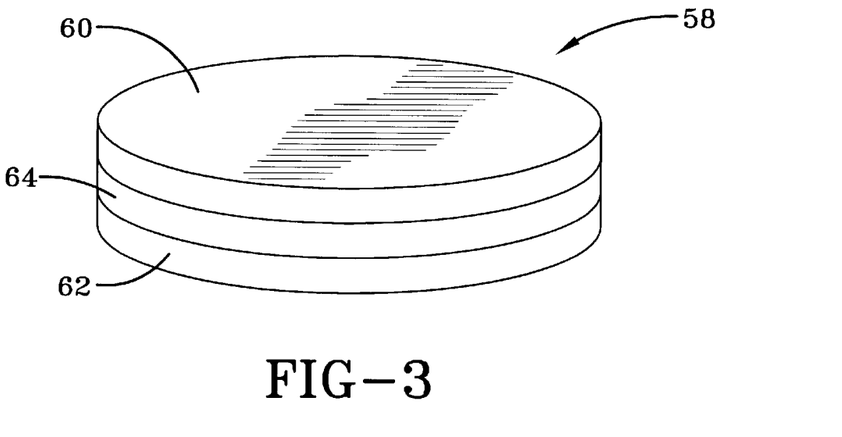
FIG. 3 is a schematic view of the layered transponder package.
Figure 4:
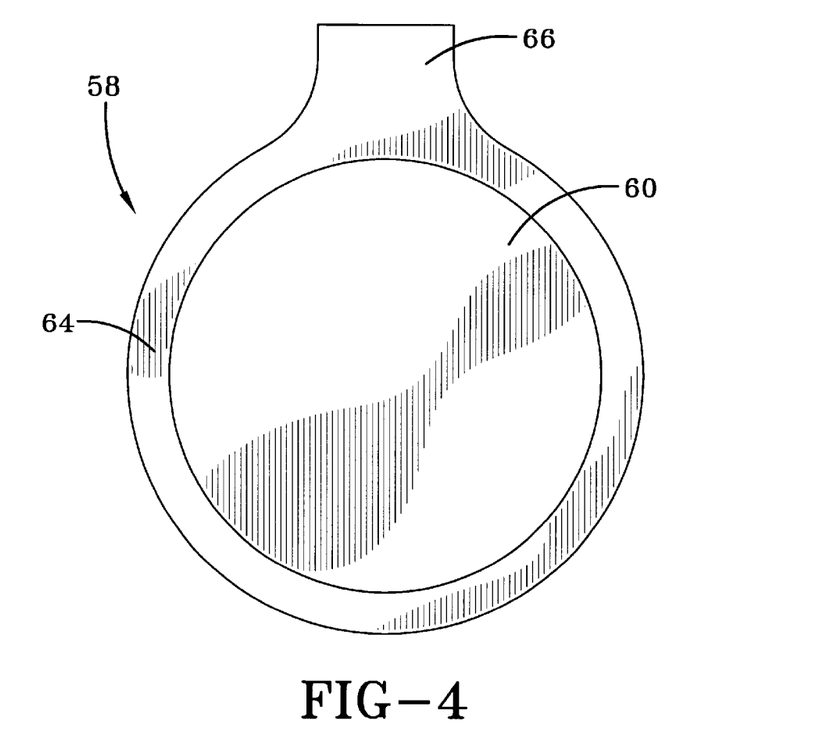
FIG. 4 is a top plan view of the transponder package.

Referring to FIGS. 2, 3, and 4, as discussed previously the transponders 42, 44 may be incorporated into a single integrated chip having an elongate geometry. In the preferred embodiment, the geometry is generally rectangular symmetric about a longitudinal axis. So as to protect the integrity of the chip and chip circuitry components from damage due to normal operation of the belt, the chip is incorporated within a disc shaped, generally circular package 58. A circular package avoids corners that concentrate stresses. In order to form package 58, the transponder chip is embedded within an elastomeric bonding layer 64 that is sandwiched between opposed layers 60, 62 of reinforcing material. In the shown embodiment, the bonding layer 64 is a rubber compound and the layers 60, 62 constitute high temperature fiber glass reinforced material. Other materials known in the industry may be substituted and utilized if so desired. The bonding layer 64 encapsulates the chip therein and bonds with layers 60, 62 to hold the layers in the package formation 58 shown.

As seen from FIG. 4, the composite package 58 consisting of the ID chip embedded between rubber and high temperature fiber glass reinforcement material is further provided with a protrusion 66 at one end. Protrusion 66 is in alignment with the longitudinal axis of the ID chip and provides the means for orienting the chip within the belt 32. Pursuant to one aspect of the invention, it is advantageous to orient the elongate ID chip axis transverse to the direction of belt travel 34 as viewed in FIG. 2. By orienting the longitudinal axis of the transponder chip transverse to the belt direction of travel 34, the shorter chip sides rather than the elongate sides are subjected to bending moments induced into the chip from normal operation of the belt. Because the chip resistance to such bending stress is greater in the shorter, transverse chip direction, there is less risk of damage to the chip when the longitudinal axis of the chip is oriented transverse to the direction of belt travel.

Figure 5:
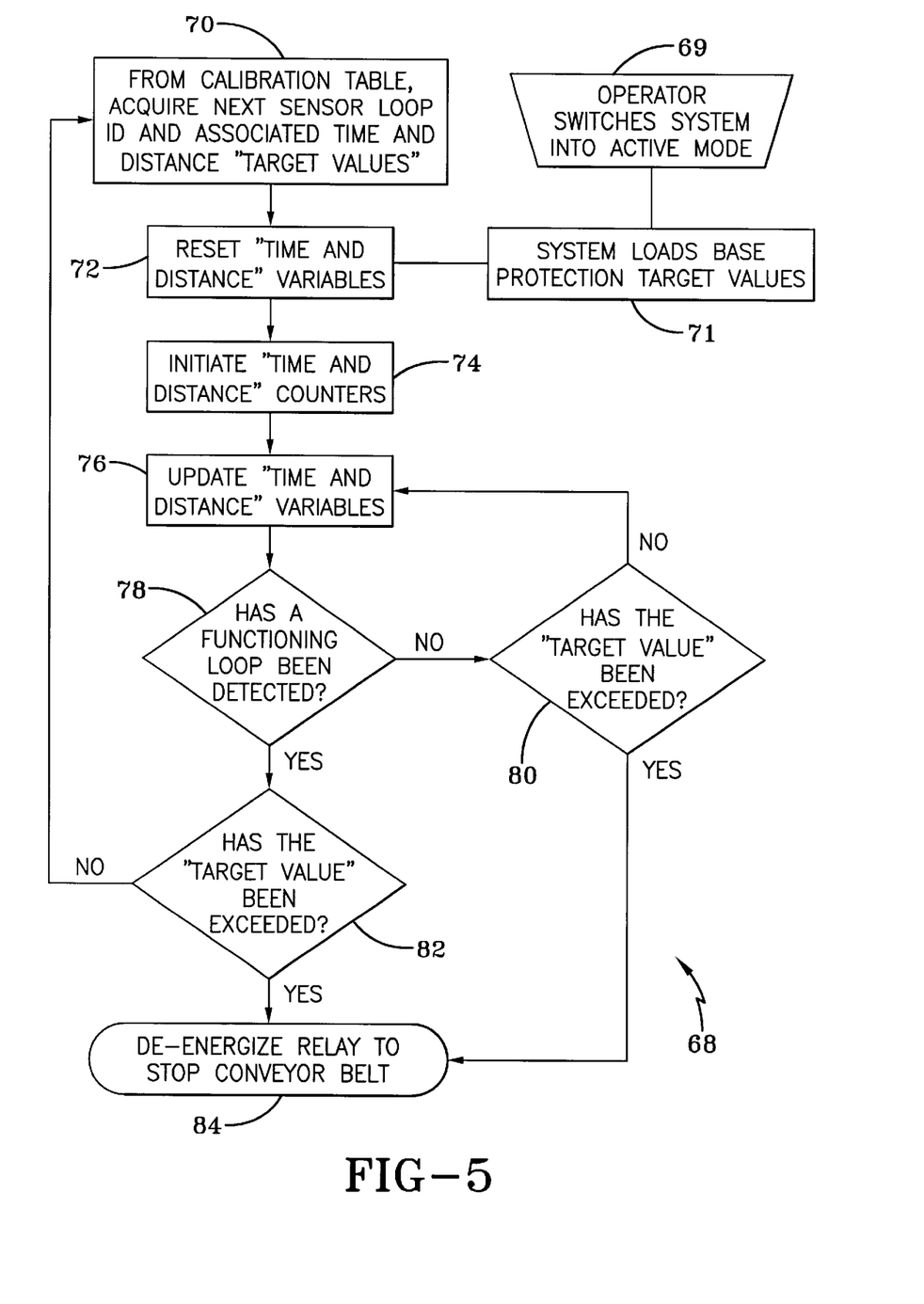
FIG. 5 is a logic block diagram representing the method of operation of the subject invention system.

FIG. 5 presents a schematic of the logic for the subject system. The precise location of each coupled sensor loop/transponder is known and may be programmed into computer memory. Since the subject invention allows for the precise detection of and identification of each coupled sensor loop/transponder in the belt, synchronization of the read function with the speed of the belt or sensor pattern is not required. Stated differently, the subject invention is not dependent on accurate detection of sensor pattern or a constant belt speed to perform the read function as with other state of the art systems. Numbers imbedded in the surface of the belt are correlated to each sensor ID.

An operator switches the system into an Active Mode (69). From a Calibration Table, the next sensor loop ID and associated time and distance "Target Values" are obtained (70). The time and distance variables that determine where the next transponder/sensor loop is determined is reset (72) based upon Base Protection Target Values loaded by the system (71). Time and distance counters are initiated (74) and time and distance variables updated (76). The system will know based upon data stored in memory the identity and estimated location of the next sensor/transponder pair in the belt. The system will transmit an energizing signal to the transponder(s) that will trigger an induction of an identification signal by the transponder into the loop(s). If two transponders and two concentric sensor loops are employed, an identification signal will appear in both sensor loops. Should one of the transponders or loops be damaged, the presence of the signal in the surviving loop will be detected and the system will conclude no breach in belt integrity has occurred. Should both loops/transponders be damaged, however, no signal will be detected and the system will conclude that a breach in belt security has occurred.

The system monitors each sensor loop(s) and decides (78) whether a functioning loop has been detected. If a functioning loop is not detected, the system determines whether the "Target Value" based upon "Time and Distance" has been exceeded (80). In the event the values for time and distance have been exceeded, a de-energizing relay signal to stop the belt (84) is given. If the values have not been exceeded, the loop reverts back to update "Time and Distance" variables (76). When a functioning loop is detected (78) and the target value exceeded (82), the belt is stopped (84). If the loop is detected and the Target Values not exceeded, the process loops back to acquire the next loop ID and associated time and distance "Target Values".

It will be noted that the system is constantly updating data on each loop/transponder location in the belt and storing such information in memory. From the updated data files the system will definitively know where to expect each sensor. Approximations based upon belt speed or pattern detection used in other systems is thus avoided and a more accurate and precise mapping of sensor presence within a belt is made. Failure to detect a sensor where the system "knows" one should be will trigger a rip stop of the belt.

From the foregoing, it will be appreciated that the subject invention achieves a sensor system having improved functional capabilities as well as performance. The package in which the transponder and loop chip is incorporated is of composite construction for enhanced package rigidity. The integrity of the chip and its circuit components is thereby protected. Moreover, the protrusion in the package allows the chip to be oriented in the longitudinal direction transverse to the belt travel path.

Additionally, it will be appreciated that the subject system may function without the need to synchronize on the expected spacing between sensor loops as with the prior art. Each sensor loop has a dedicated coupled transponder with a unique identification code. An accurate location of the particular sensor that indicates a tear or rip may be made by positive identification of the transponder coupled with the sensor loop. The loop signal and belt location is correlated to assist in troubleshooting when a rip or tear is indicated.

A "Stop On Command" signal is possible with the present invention because a positive location in the belt can be made. The ability to correlate sensor location to belt location allows the operator to stop the belt at a position that provides optimal access to any region and/or where inspections or repairs can most readily be effected.

The sensor loops in the present invention substantially span the belt and provide thorough rip detection coverage. While represented in a rectangular geometry, the sensor loops may have diverse designs if desired. The system further utilizes digital signals which are immune to extraneous "noise". Erroneous rip detection tendencies in analog systems caused by environmental "noise" or false signals is thereby avoided.

It will further be appreciated that the subject invention allows for wear rate monitoring as well as rip detection. The transponder and sensor loops may be placed into a belt at specific depth. As the belt wears down to such depth, damage to the sensor loop(s) will occur and detection may be made as described above. The transponder will allow identify the amount of wear to that point and aid in predicting the accurate scheduling of replacement. The same transponder/sensor loop system can thus be used to ascertain whether a sensor loop is damaged by a rip or tear, or by wear.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A conveyor belt incorporating within it a rip detection sensor comprising a conductor formed in an endless loop, characterized in that:
   the belt includes at least one transponder secured to the belt in coupled relationship with the conductor; and
   the transponder transmits information identifying the location of the conductor along the belt.

2. The conveyor belt according to claim 1 characterized in that the belt includes at least a second transponder secured to the belt in coupled relationship with the conductor and redundantly transmitting information identifying the location of the conductor along the belt.

3. The conveyor belt according to claim 1 characterized in that the belt includes at least a second redundant conductor formed in an endless loop and coupled to the one transponder.

4. The conveyor belt according to claim 1 characterized in that the transponder is disposed between opposed layers of reinforcement material within a transponder package.

5. The conveyor belt according to claim 4 characterized in that the transponder resides within a layer of elastomeric material situated between the layers of reinforcement material.

6. The conveyor belt according to claim 4 characterized in that the transponder package includes means for orienting the package relative to a direction of belt travel.

7. The conveyor belt according to claim 6 characterized in that the means for orienting the package comprise a protrusion.

8. The conveyor belt according to claim 1 characterized in that the transponder is elongate having a longitudinal axis transversely oriented to a direction of travel of the belt.

9. The conveyor belt according to claim 8 characterized in that the transponder package includes means for orienting the transponder longitudinal axis transverse to the direction of belt travel.

10. A conveyor belt rip detection system, comprising:
   a conveyor belt incorporating within it a rip detection sensor comprising a conductor formed in an endless loop;
   at least one transponder electrically coupled to the conductor loop and transmitting transponder identification information;

an external first detector for receiving the transmitted transponder identification information.

11. A sensor system according to claim 10 characterized in that the system includes at least a second external detector mounted to detect the presence of the signal induced in the loop conductor by the transponder to monitor conductor loop integrity.

12. A sensor system according to claim 11 characterized in that the first detector is mounted substantially over the transponder and the second detector is mounted over the conductor loop at an opposite side of the belt.

13. A sensor system according to claim 10 characterized in that the system comprises a plurality of conductor loops spaced at intervals along the belt, each loop having at least one respective transponder coupled therewith, and each transponder transmitting to the detector an identification signal identifying the transponder.

14. A sensor system according to claim 13 characterized in that the system includes second detector means for detecting a discontinuity in a specific loop along the belt and control means for cross referencing the identification signal of the transponder associated with the specific loop to ascertain the location of the specific loop along the belt.

15. A method of manufacturing a sensor system for a conveyor belt incorporating within it a rip detection sensor comprising at least one conductor formed in an endless loop, characterized by:

providing a transponder coupled with the loop and adapted to transmit an identification;

locating a detector adjacent the belt to receive the identification signal from the transponder;

providing detection means to detect the presence of a discontinuity in the conductor loop; and providing control means to immobilize the belt in the event a discontinuity in at least one loop is detected.

16. A method according to claim 15 characterized by providing a redundant transponder in the belt coupled with the loop and adapted to transmit an identification signal through the loop to a detector.

17. A method according to claim 16 characterized by providing a redundant endless second loop concentric with the at least one conductor loop.

18. A method according to claim 17 characterized by:

housing the transponder into a transponder package; and positioning the elongate package within the belt so that the transponder is preferentially oriented with respect to a direction of belt travel.

19. A method according to claim 15 characterized by providing means for preferentially orienting the transponder relative to a direction of belt travel.

20. A method according to claim 15 characterized by:

providing a plurality of transponder to conductor loop coupled pairs at spaced apart intervals within the belt;

storing data specifying the location of each transponder to conductor loop coupled pair within the belt;

using said stored data to predict the expected location of each transponder to conductor loop coupled pair;

detecting the actual location of each transponder to conductor loop coupled pair;

cross referencing the location of each transponder to conductor loop coupled pair detected with the expected location of said transponder to conductor loop coupled pair; and updating the stored data regarding each said transponder to conductor loop coupled pair location within the belt.

* * * * *